April 23, 1968 R. S. FARR 3,378,994
AIR FILTER ASSEMBLY
Filed June 3, 1966 3 Sheets-Sheet 1

RICHARD S. FARR
INVENTOR.

BY *Lyon & Lyon*
ATTORNEYS

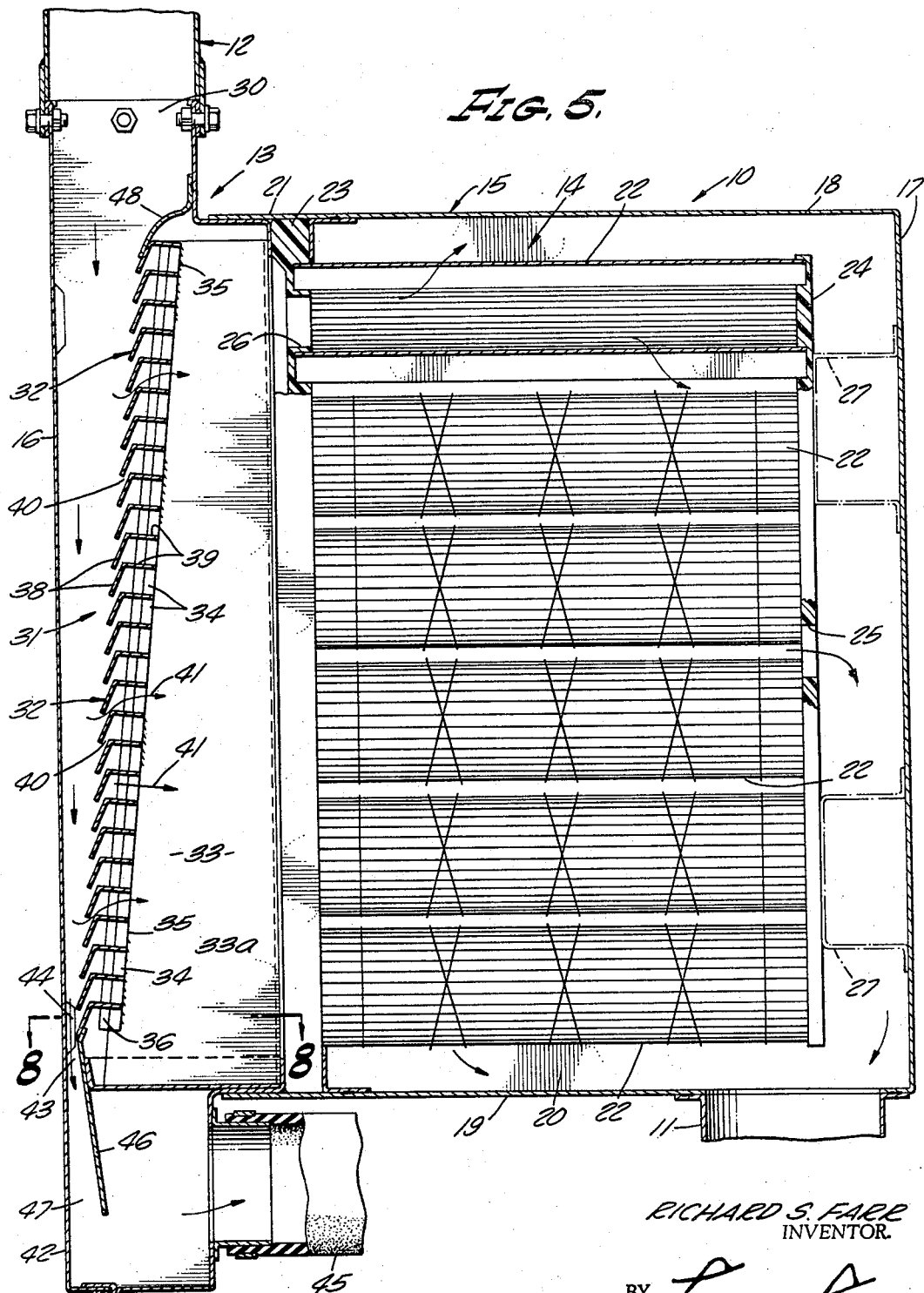

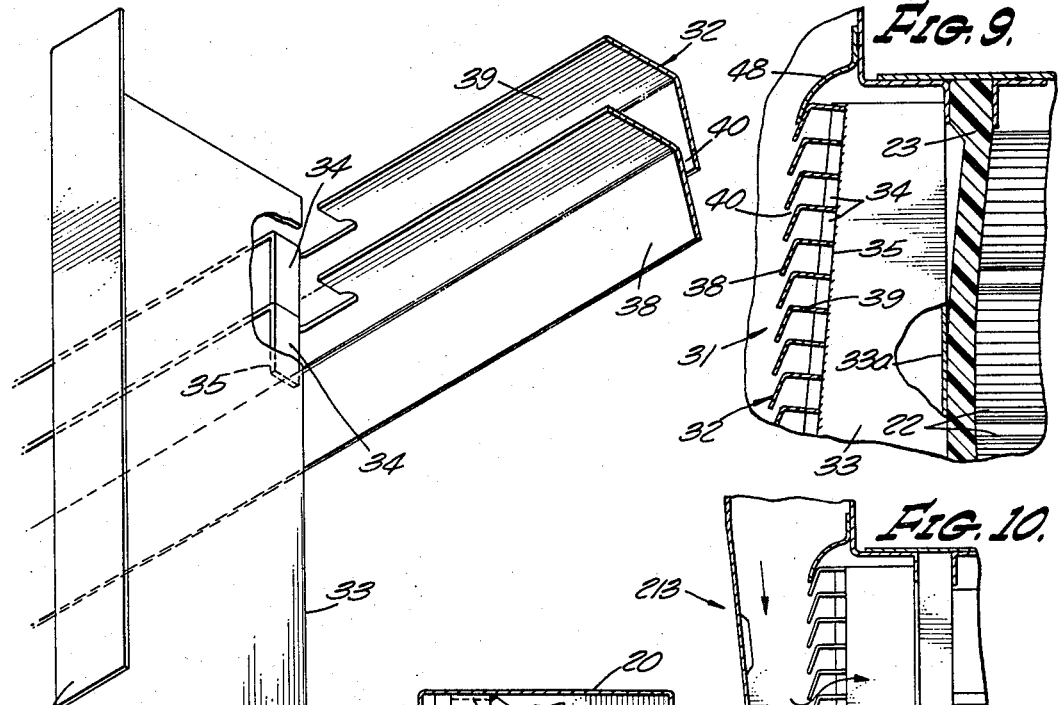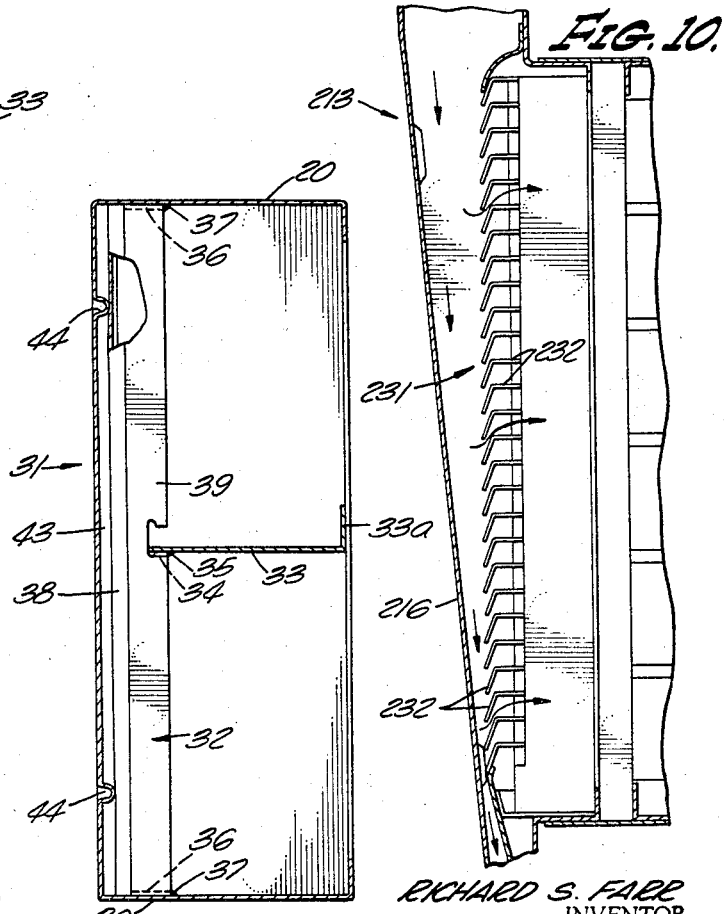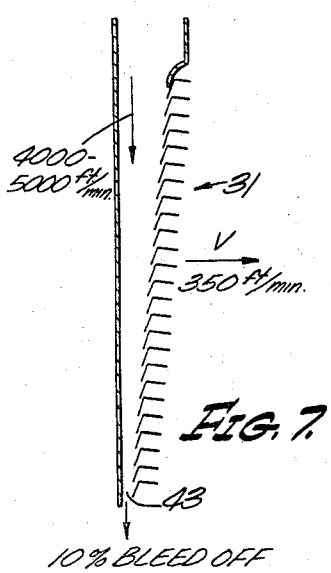

3,378,994
AIR FILTER ASSEMBLY
Richard S. Farr, Los Angeles, Calif., assignor to Farr Company, El Segundo, Calif., a corporation of California
Filed June 3, 1966, Ser. No. 555,045
1 Claim. (Cl. 55—324)

This invention relates to an air filter assembly comprising a precleaner and a fine filter and in particular is directed to a compact air filter assembly for use with equipment having limited available space.

There are numerous equipment installations which require well filtered air and yet operate in an extremely dusty or otherwise contaminated environment. For example, earth moving and road working equipment employ internal combustion engines requiring substantially clean air for proper and continued operation and yet the available air is heavily dust-laden particularly at or below the level of the engine. It is well recognized that an operable and practical filter for such an environment must be provided with some form of precleaner arrangement for continually removing and disposing of a substantial proportion of the dust from the supply air and, in addition, a fine filter for removing the balance of the objectionable dust which fine filter is periodically replaced or cleaned. The useful life of such fine filter between required replacement or cleaning is extremely important to the economical operation of the filter assembly and such useful life is critically dependent on the efficiency with which the precleaner removes dust. While many known filter assemblies may be capable of at least partially accomplishing these functions, the size of such assemblies and the limited space available on the equipment for mounting same precludes the use of most of these devices particularly with respect to the "floor" space occupied. Further, it has been found that a substantial reduction in the concentration of dust in the supply air may be achieved by having an intake duct extending upwardly from the filter assembly to the maximum height above the equipment that is practical. However, certain filter arrangements require a horizontal intake due to either operational characteristics or special considerations and, therefore, valuable space is occupied by ducting to feed the air from the vertical intake duct into the horizontal filter. Moreover this necessary change in flow direction introduces an objectionable pressure drop.

Accordingly, it is a principal object of this invention to provide a novel form of air filter assembly comprising a precleaner having an inlet positioned at a right angle to the outlet which in turn is aligned with the inlet to a fine filter wherein such change in direction through the precleaner is a necessary and useful portion of the operation of the precleaner.

Another object of this invention is to provide a novel form of precleaner for use in a filter assembly with a fine filter wherein the precleaner is relatively flat and particularly suited for positioning in a vertical attitude for causing a right angle change in direction of flow between the downward incoming air and the preclaimed outlet air passing horizontally through the fine filter.

A further object of this invention is to provide a novel form of air filter assembly having a precleaner and fine filter which occupies a relatively small floor space wherein the precleaner serves as an airflow turning device between the vertical air intake to the assembly and the horizontal air intake to the fine filter. A still further object is to provide such an assembly wherein the precleaner includes a multiplicity of spaced horizontal reversing vanes adapted to discharge the cleaned air horizontally from the panel while the increasingly concentrated contaminated air flows downwardly to and through a bleed outlet.

Still another object of this invention is to provide a novel form of filter assembly combining a precleaner and fine filter occupying a relatively small amount of floor space and having a narrow vertical intake duct with an upper inlet end facing slightly downwardly and screened to exclude large particulate matter.

Still another object of this invention is to provide a filter assembly of this type wherein the precleaner is an inertial separating type device including a bleed slot for exhausting concentrated contaminated air and wherein a smoothly expanding passageway extends from such bleed slot to minimize pressure losses.

Other and more detailed objects and advantages of this invention will appear from the following description and the accompanying drawings, wherein:

FIGURE 5 is an enlarged sectional elevation of the device taken substantially on the line 5—5 in FIGURE 2.

FIGURE 6 is a fragmentary perspective view of the precleaner blade mounting on the center support strut.

FIGURE 7 is a diagrammatic view of typical flow velocity relationships in the precleaner.

FIGURE 8 is a sectional plan view taken substantially on the line 8—8 in FIGURE 5.

FIGURE 9 is a fragmentary sectional elevation similar to FIGURE 5 and illustrating the support afforded the fine filter by the center support strut of the precleaner under some conditions.

FIGURE 10 is a fragmentary sectional elevation similar to FIGURE 5 and illustrating a modified form of precleaner of the device of this invention.

Figure 1:
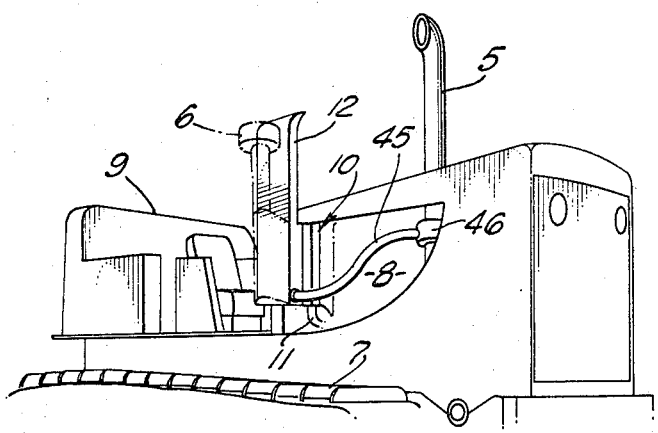
FIGURE 1 is an elevation view of a tractor employing the air filter assembly of this invention.

Referring now to FIGURE 1, a typical installation of the air filter assembly, generally designated 10, of this invention on a conventional tractor 9 is shown although it will be readily appreciated by those skilled in the art that the utility of the assembly 10 is not limited to use on tractors or other earth moving equipment. Here the filter assembly 10 is shown as mounted on the top of the tractor with a duct 11 connecting the outlet of the filter to the intake of the tractor engine 8. It will also be appreciated by those skilled in the art that the filter assembly 10 may be mounted elsewhere on the tractor and in some arrangements must be mounted on the side of the tractor down closer to the tracks 7. This further necessitates the use of an intake duct 12 on the filter assembly 10 with such duct extending a substantial distance above the track to draw air from a less contaminated level. A comparable heretofore conventional filter assembly is shown by dashed lines 6 superimposed on the filter assembly 10 and it is to be noted that such conventional assembly has a substantially greater longitudinal length and requires a substantially wider intake duct. Specifically the heretofore conventional filter assembly may be of the type disclosed in U.S. Letters Patent 3,071,915 issued to the assignee of this invention, although the use of the vertical intake duct which has since been employed in many installations is not disclosed in such patent. However since the precleaner of Patent 3,071,915 has a horizontal intake requiring horizontal air flow into it the vertical intake duct must be positioned a distance in front of the precleaner to allow the incoming air to change directions of flow. This is but one example of the particular deficiencies of heretofore conventional devices under certain requirements.

The air filter assembly 10 involves a two-stage filtering operation acting in concert to produce the clean air needed for the particular equipment such as the intake of the internal combustion engine 8 of the tractor. These two stages may be generally designated as a precleaner 13 and a fine filter 14 mounted in a housing 15. The housing 15 is generally rectangular and for convenience may be said to include a front wall 16, a back wall 17, a top wall 18, bottom wall 19 and spaced side walls 20 although it is to be noted that due to maintenance and construction considerations, the housing is separable between the precleaner 13 and fine filter 14 along a vertical plane at 21.

The fine filter 14 may be of any convenient type which has a horizontal intake when the filter is oriented in its spacially most advantageous position and which is capable of accomplishing the desired high efficiency filtering. In this regard it is preferred that fine filter 14 be of the type disclosed in the aforementioned Patent No. 3,071,915 which includes a plurality of cylindrical pleated paper filters 22 assembled as a cartridge with their axes positioned horizontally. The plural filters 22 are arranged in any convenient geometrical pattern to provide a small amount of space therebetween for airflow. The ends of filters 22 are supported by molded flanges 23 and 24. Flange 24 closes the ends of the cylindrical filters 22 and is provided with openings 25 between the filters for permitting the convenient escape of cleaned air from between filters. The flange 24 is spaced and supported a short distance from back wall 17 of the housing by brackets 27 to allow the flow of air around the fine filter cartridge of the outlet at the bottom of the housing connected to duct 11. The flange 23 is molded to the other end of the filters 22 and forms a partition wall in the housing 15 between the precleaner and fine filter stages. Openings 26 are provided in a flange 23 at each filter 22 in alignment with the internal cylindrical opening in the filter. Thus the precleaned air passes through the openings 26 into the inside of the cylindrical paper filters 22 and out through the filter paper into the surrounding space formed by the housing 15 and the dust or other particulate matter is deposited and remains on the inside of the filters 22.

Figure 2:
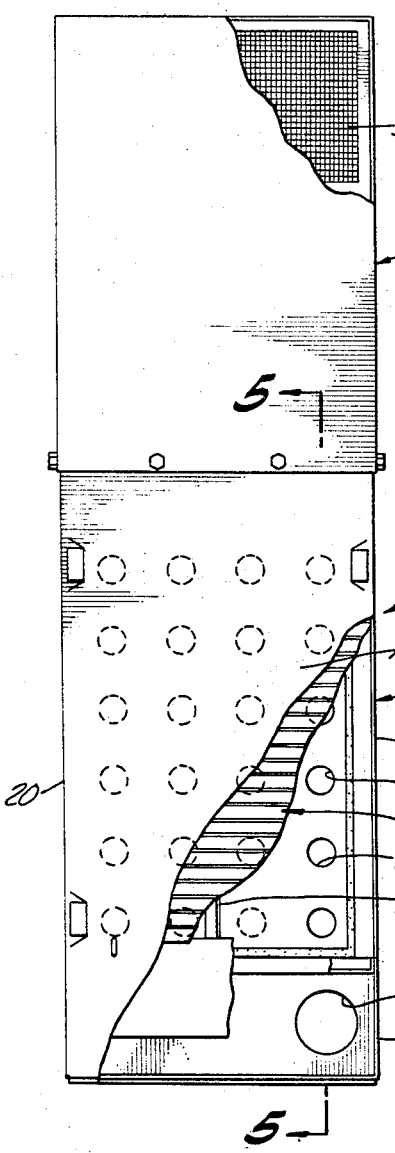
FIGURE 2 is an enlarged front elevation view of the device of this invention with portions of the device broken away to reveal the interior components.
Figure 3:
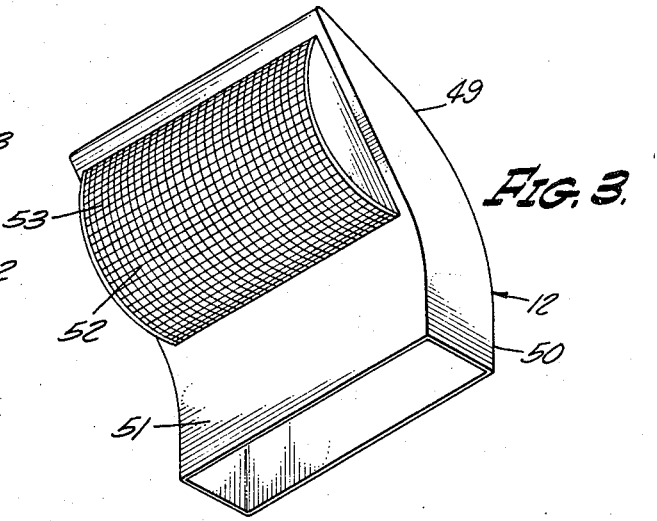
FIGURE 3 is a perspective view of the intake duct shown in FIGURES 1 and 2 removed from the filter assembly.

Means are provided for removing a substantial portion of the dust and other particulate matter from the available supply air before the air reaches the fine filter and, as shown in the drawings, these means may include the precleaner 13. The housing 15 is provided with an elongated intake opening 30 in the upper wall 18 extending laterally across the entire housing 15 and positioned adjacent to the front wall 16. The precleaner 13 is of the inertial separating type and includes a panel, generally designated 31, for producing the forces necessary to inertially separate the dust from the air. Panel 31 is comprised of a multiplicity of individual blades 32 extending horizontally between the housing sidewalls 20. The blades 32 are mounted in overlapping spaced relationship by any convenient means such as securing the blades to the sidewalls 20 and an intermediately positioned support bracket 33 extending between the top and bottom walls on the back of the blades 32. The single support bracket 33 is laterally centered in the housing thereby falling between the openings 26 into the fine filters 22 as shown in FIGURE 2 although it is obvious that additional brackets may be employed or offset from center as required in a particular embodiment of the device. Referring to FIGURES 6 and 8, each blade 32 is provided with a tab 34 bent at a right angle thereto at the location of the support bracket 33 to fit against the bracket. The tabs 34 are of a length equal to the desired spacing between blades thereby serving as a physical guide to properly spacing the blades. The tabs 34 are weld at 35 to the support bracket 33. The ends of the blades 33 are provided with similar spacing and mounting tabs 36 which are welded at 37 either directly to the side walls 20, as shown, or to a plate which is in turn connected to the side walls as is convenient. In this manner the blades are uniformly spaced to the optimum distance and rigidly supported against vibration and deformation.

The support bracket 33 also serves to support the front flange 23 of the fine filter 14 against excessive flexure or vibration by means of a right-angle flange 33a along the rear edge adapted to engage the face of molded flange 23 as shown in FIGURE 9.

Each blade 32 includes a downwardly and forwardly extending flat portion 38 positioned at a small acute angle to both the front wall 16 and the plane of the panel 31. A rearwardly extending flat portion 39 is smoothly joined by a slight radius portion to flat portion 38. The forward flat portions 38 or upstream portions of adjacent blades are positioned in overlapping relation to form narrow upwardly extending passageways 40 for causing the incoming air to virtually reverse its direction of downward flow to the slightly inclined upward flow through from the air with the dust continuing downwardly. The rearward flat portions 39 project horizontally thereby causing the upwardly flowing cleaned air from passageways 40 to assume a direction of relatively horizontal flow as shown by arrows 41 directly toward the horizontal openings 26 to the fine filter 14. A typical blade configuration which has been found to have excellent operational characteristics combines a upstream portion 38 of .687″, a downstream portion 39 of .562″, and angle of 109° between such portions, and one-half inch spacing between blades whereby passageway 40 is about one-eighth inch wide.

The panel 31 is inclined to the front wall 16 at a small acute angle converging downwardly whereby the space between panel 31 and front wall 16 decreases in the downward direction thereby decreasing the cross-sectional flow area of the incoming air. By thus decreasing the cross-sectional flow areas cleaned air passes through successive passageways 25 in the panel 31, the velocity of airflow is maintained to assure effective inertial dust separation throughout the height of the panel 31. In contrast the air flow velocity behind panel 31 is greatly reduced due to the large flow area in the horizontal direction. As shown in FIGURE 7 the incoming velocity in the precleaner may be four to five thousand ft./min. whereas the outlet leading to the fine filter is only 350 ft./min.

A dust bin 42 extends across the bottom of precleaner 13 for receiving a portion of the supply air through the bleed slot 43 between the bottom of panel 31 and front wall 16 which portion of supply air is concentrated with the dust separated from the air passing through the panel 31. The size of bleed slot is established by position panel 31 with the lowermost blades 32 engaging the bosses 44 formed in the front wall 16. Bleed slot 43 is extremely narrow as for example between 1/16″ and 3/16″ depending on the size of the precleaner whereby the high velocity is maintained to and through the bleed slot thereby assuring that the separated dust will continue into the dust bin. Further, the entire front wall 16 is planar and forms one side of the bleed slot to minimize turbulence. A conduit 45 connects dust bin 42 to any convenient arrangement for continually drawing a suction on the dust bin 42 such as aspirator 46 on the exhaust pipe 5 of the tractor. This serves to continually exhaust the highly dust-laden air from dust bin 42. A plate 46 extends from the panel side of bleed slot 43 downwardly into the dust bin 42 at an angle to front wall 16 thereby forming an expanding bleed passageway 47 serving to smoothly expand the bleed air. The upper end of panel 31 is smoothly joined to the rearward side of the intake opening 30 by a plate 43 whereby all of the incoming supply air is confined between the front wall 16 and panel 31.

Figure 4:
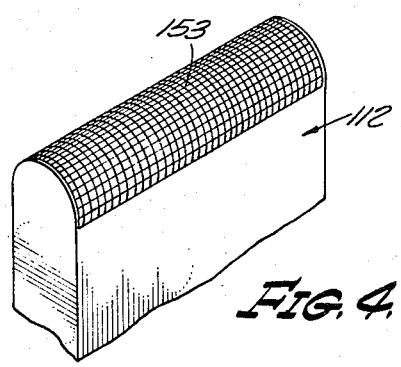
FIGURE 4 is a fragmentary perspective view of a modified form of intake duct.

The intake duct 12 extends upwardly from the opening 30 to the desired height. The upper end of duct 12 is provided with a curved portion 49 extending from one wall 50 of the duct beyond the plane of the other wall 51 thereby forming a slightly downwardly facing opening 52 on the latter side of the duct. Opening 52 is preferably covered by a screen 53 whereby large foreign materials will be excluded from the duct and when the engine is shut off such materials will fall from the screen. In the modified form of intake duct 112 shown in FIGURE 4 the duct has the same rectangular shape for fitting the intake opening 30 but the inlet to the duct faces upwardly and is merely covered with a curved screen 153.

The modified form of precleaner 213 shown in FIGURE 10 is substantially identical to the heretofore described precleaner 13 except in that the panel 231 of blades 232 is positioned vertically and the front wall 216 is inclined to provide the converging incoming air passageway. Thus the angular relationship between the separating panel and the front wall remains the same as do the operational characteristics.

It is to be noted that the precleaner 13 and the intake duct 12 are extremely flat thereby minimizing the "floor area" required to accommodate that portion of the entire assembly. This extreme reduction in size is not only compatible with this type of precleaner but in fact enhances the operation of this inertial precleaner due to the high velocities desired for accomplishing the precleaning function. For example an embodiment of the precleaner of this invention having the afore-described blade configuration and operating at the flow characteristics shown in FIGURE 7, was tested using a standard fine air cleaner test dust (particle sizes by weight of; 39% 0–5 microns, 18% 5–10 microns, 16% 10–20 microns, 18% 20–40 microns and 9% 40–80 microns) and found to be approximately 84% efficient in the removal of such dust which is highly acceptable level for such devices. This is unusually effective for inertial separation of fine dust since over 90% of the dust particles greater than 10 microns in size are removed. This permits the use of a highly efficient flow-through type fine filter 14 without such filter becoming overload and clogged in too short a time. It is to be noted that the dust separated by precleaner 13 as well as the bleed air carrying such dust is kept completely separate and continually discharged from the device without any possibility of contaminating the fine filter 14 or the clean air. This is to be distinguished from low efficiency devices which attempt to merely allow the dust to settle in a bin and draw the bleed air back into the precleaned air stream.

The vertical flow direction of incoming air is the most advantageous orientation for this type of precleaner and this is also compatible with the desired use of a vertical intake duct on certain installations. Moreover, the inertial separating is accomplished in this precleaner by reversing the airflow to an inclined upward direction which is then further changed to a horizontal airflow directly into the horizontally facing fine filter of the assembly.

Having fully described my invention it is to be understood that I do not wish to be limited to the details herein described or shown in the drawings but my invention is of the full scope of the appended claim.

I claim:
1. A two-stage air filter assembly adapted for use in areas of high dust concentration comprising; a housing having a substantially planar front wall, an intake opening adjacent and at a right angle to said front wall, a substantially planar inertial separating panel mounted in said housing at a small acute angle to said front wall with the diverging ends of said panel and wall on opposite sides of and immediately adjacent said intake opening, the converging extremities of said front wall and panel being closely spaced to form a bleed slot therebetween, means for continually drawing some air and inertially separated dust through said bleed slot and discharging such air and dust from the assembly, said panel having a multiplicity of spaced blades positioned substantially perpendicular to the direction between said intake opening and said bleed slot with said blades forming cleaned-air outlets through the panel between blades, said blades having spaced portions extending in the direction away from said intake opening joined to other spaced portions extending away from said front wall whereby said outlets are formed to extend first in a direction substantially reverse from the air coming from said intake opening and next in a direction substantially perpendicularly away from said front wall, a partition wall in said housing positioned relatively parallel or at a small angle to said panel and spaced a short distance from said panel on the side opposite from said front wall, a plurality of cylindrical pleated paper filters extending from said partition wall away from said panel, openings in said partition wall aligned with the interior of each said paper filter for allowing the air to pass from said panel into and through said paper filters for fine filtering, a support bracket positioned between said panel and said partition wall and joined to said blades intermediate the length of the blades to reinforce said panel, said support bracket having a flange adjacent and parallel to said partition wall for engaging at least a portion of said partition wall to support the partition wall against vibration and flexure toward said panel, and said flange being located between said openings in said partition wall.

References Cited

UNITED STATES PATENTS

| 1,406,299 | 2/1922 | Sturt et al. | |
|-----------|--------|--------------|--|
| 1,375,422 | 4/1921 | Sherer. | |
| 1,828,816 | 10/1931 | Pierson. | |
| 2,152,115 | 3/1939 | Van Tongeren. | |
| 2,197,503 | 4/1940 | Martin. | |
| 2,455,252 | 11/1948 | Heth. | |
| 2,666,497 | 1/1954 | Weber. | |
| 2,787,334 | 4/1957 | Linderoth | 55—443 |
| 3,071,915 | 1/1963 | Hardy | 55—337 |
| 3,137,553 | 6/1964 | Billey | 55—431 |
| 3,190,058 | 6/1965 | Farr et al. | 55—442 |

FOREIGN PATENTS

| 119,075 | 4/1947 | Sweden. |
| 191,002 | 8/1937 | Switzerland. |
| 284,790 | 12/1952 | Switzerland. |

HARRY B. THORNTON, *Primary Examiner.*

D. TALBERT, *Assistant Examiner.*